US010562100B2

(12) United States Patent
Welch

(10) Patent No.: US 10,562,100 B2
(45) Date of Patent: Feb. 18, 2020

(54) MICRO LATTICE HYBRID COMPOSITE FAN BLADE

(71) Applicant: United Technologies Corporation, Farmington, CT (US)

(72) Inventor: David A. Welch, Quaker Hill, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 1024 days.

(21) Appl. No.: 15/226,147

(22) Filed: Aug. 2, 2016

(65) Prior Publication Data

US 2018/0038385 A1  Feb. 8, 2018

(51) Int. Cl.
*B22F 5/04* (2006.01)
*F01D 5/14* (2006.01)
*B22F 3/105* (2006.01)
*F04D 29/02* (2006.01)
*B22F 7/06* (2006.01)
*F04D 29/32* (2006.01)
*B64C 11/26* (2006.01)
*F01D 5/28* (2006.01)

(52) U.S. Cl.
CPC ............... *B22F 5/04* (2013.01); *B22F 3/1055* (2013.01); *B22F 7/06* (2013.01); *B64C 11/26* (2013.01); *F01D 5/147* (2013.01); *F04D 29/023* (2013.01); *F04D 29/324* (2013.01); *B22F 2998/10* (2013.01); *F01D 5/282* (2013.01); *F05D 2220/36* (2013.01); *F05D 2230/22* (2013.01); *F05D 2230/30* (2013.01); *F05D 2230/31* (2013.01); *F05D 2300/133* (2013.01); *F05D 2300/603* (2013.01); *F05D 2300/612* (2013.01); *Y02P 10/295* (2015.11)

(58) Field of Classification Search
CPC ........ F04D 29/023; F04D 29/324; B22F 7/06; F01D 5/147; B64C 11/26
See application file for complete search history.

(56) References Cited

U.S. PATENT DOCUMENTS

| 2011/0038732 | A1* | 2/2011 | Huth | B29C 70/24 |
| | | | | 416/229 A |
| 2015/0064015 | A1* | 3/2015 | Perez | F01D 5/282 |
| | | | | 416/229 R |
| 2016/0115822 | A1* | 4/2016 | Cortequisse | B22F 5/04 |
| | | | | 415/200 |
| 2017/0356478 | A1* | 12/2017 | Guest | F15D 1/12 |

FOREIGN PATENT DOCUMENTS

WO  2015105547 A2  7/2015

OTHER PUBLICATIONS

European Search Report for European Application No. 17184577.9 dated Jan. 22, 2018, 7 pages.

* cited by examiner

*Primary Examiner* — Woody A Lee, Jr.
(74) *Attorney, Agent, or Firm* — Cantor Colbun LLP

(57) ABSTRACT

A fan blade includes a lattice structure, a fill, and a structural wrap. The lattice structure defines an airfoil body that has a cavity. The lattice structure defines at least one spar that extends radially from a root of the airfoil body towards a tip of the airfoil body. The fill is disposed within the cavity. The structural wrap is disposed about the lattice structure. The structural wrap defines a plurality of plies that extend from a leading edge of the airfoil body towards a trailing edge of the airfoil body.

15 Claims, 2 Drawing Sheets

MICRO LATTICE HYBRID COMPOSITE FAN BLADE

BACKGROUND

This disclosure relates to a fan blade, and more particularly to a composite fan blade having a micro lattice structure.

Gas turbine engines are provided with fan modules that include fan blades and cases configured to contain the fan blades. The fan blade modules contribute to approximately 25% to 30% of an overall weight of the gas turbine engine.

Accordingly, it is desirable to provide a fan module of lighter weight with strain energy capability during a fan blade impact event.

BRIEF DESCRIPTION

According to an embodiment of the present disclosure, a gas turbine engine is provided. The gas turbine engine includes a fan blade having a lattice structure and a structural wrap. The lattice structure extends radially from a portion of a root towards a tip and extends axially from a leading edge towards a trailing edge. The lattice structure defines an airfoil body that has a cavity. The structural wrap is disposed about the airfoil body. The structural wrap extends radially from the portion of the root towards the tip and extends axially from the leading edge towards the trailing edge.

In addition to one or more of the features described above, or as an alternative to any of the foregoing embodiments, the lattice structure is made of powdered metal material.

In addition to one or more of the features described above, or as an alternative to any of the foregoing embodiments, the lattice structure is made of a powdered nonmetallic material.

In addition to one or more of the features described above, or as an alternative to any of the foregoing embodiments, the lattice structure includes a first portion having a first thickness and a second portion having a second thickness greater than the first thickness.

In addition to one or more of the features described above, or as an alternative to any of the foregoing embodiments, wherein the fan blade includes a fill disposed within the cavity.

In addition to one or more of the features described above, or as an alternative to any of the foregoing embodiments, the fill is at least one of a resin-based fill, a structural foam, and a fiber-based fill.

In addition to one or more of the features described above, or as an alternative to any of the foregoing embodiments, the root is made of a metallic material.

In addition to one or more of the features described above, or as an alternative to any of the foregoing embodiments, the structural wrap is made of a composite material.

According to an embodiment of the present disclosure, a fan blade for a gas turbine engine is provided. The fan blade includes a lattice structure, a fill, and a structural wrap. The lattice structure defines an airfoil body that has a cavity. The lattice structure defines at least one spar that extends radially from a root of the airfoil body towards a tip of the airfoil body. The fill is disposed within the cavity. The structural wrap is disposed about the lattice structure. The structural wrap defines a plurality of plies that extend from a leading edge of the airfoil body towards a trailing edge of the airfoil body.

In addition to one or more of the features described above, or as an alternative to any of the foregoing embodiments, the lattice structure is made of a powdered metal material.

In addition to one or more of the features described above, or as an alternative to any of the foregoing embodiments, the lattice structure is made of a powdered nonmetallic material.

In addition to one or more of the features described above, or as an alternative to any of the foregoing embodiments, the fill is at least one of a resin based fill, a foam fill, and a thermoplastic fill.

In addition to one or more of the features described above, or as an alternative to any of the foregoing embodiments, the structural wrap is made of a composite material.

In addition to one or more of the features described above, or as an alternative to any of the foregoing embodiments, the fan blade includes a second sheath that is bonded to the structural wrap and extending between the trailing edge and the tip of the airfoil body.

According to yet another embodiment of the present disclosure, a method of manufacturing a fan blade is provided. The method includes forming a lattice structure that defines an airfoil body. The method further includes filling an interior of the lattice structure with a fill. The combination of the lattice structure and the fill define at least one spar that extends from a root of the airfoil body towards a tip of the airfoil body.

In addition to one or more of the features described above, or as an alternative to any of the foregoing embodiments, the lattice structure is formed by direct laser metal sintering of a powdered material.

In addition to one or more of the features described above, or as an alternative to any of the foregoing embodiments, the powdered material is a powdered metal.

In addition to one or more of the features described above, or as an alternative to any of the foregoing embodiments, the method further includes wrapping a structural wrap that defines a plurality of plies about an exterior of the lattice structure.

In addition to one or more of the features described above, or as an alternative to any of the foregoing embodiments, the method further includes applying a first sheath to the structural wrap proximate a leading edge of the airfoil body.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
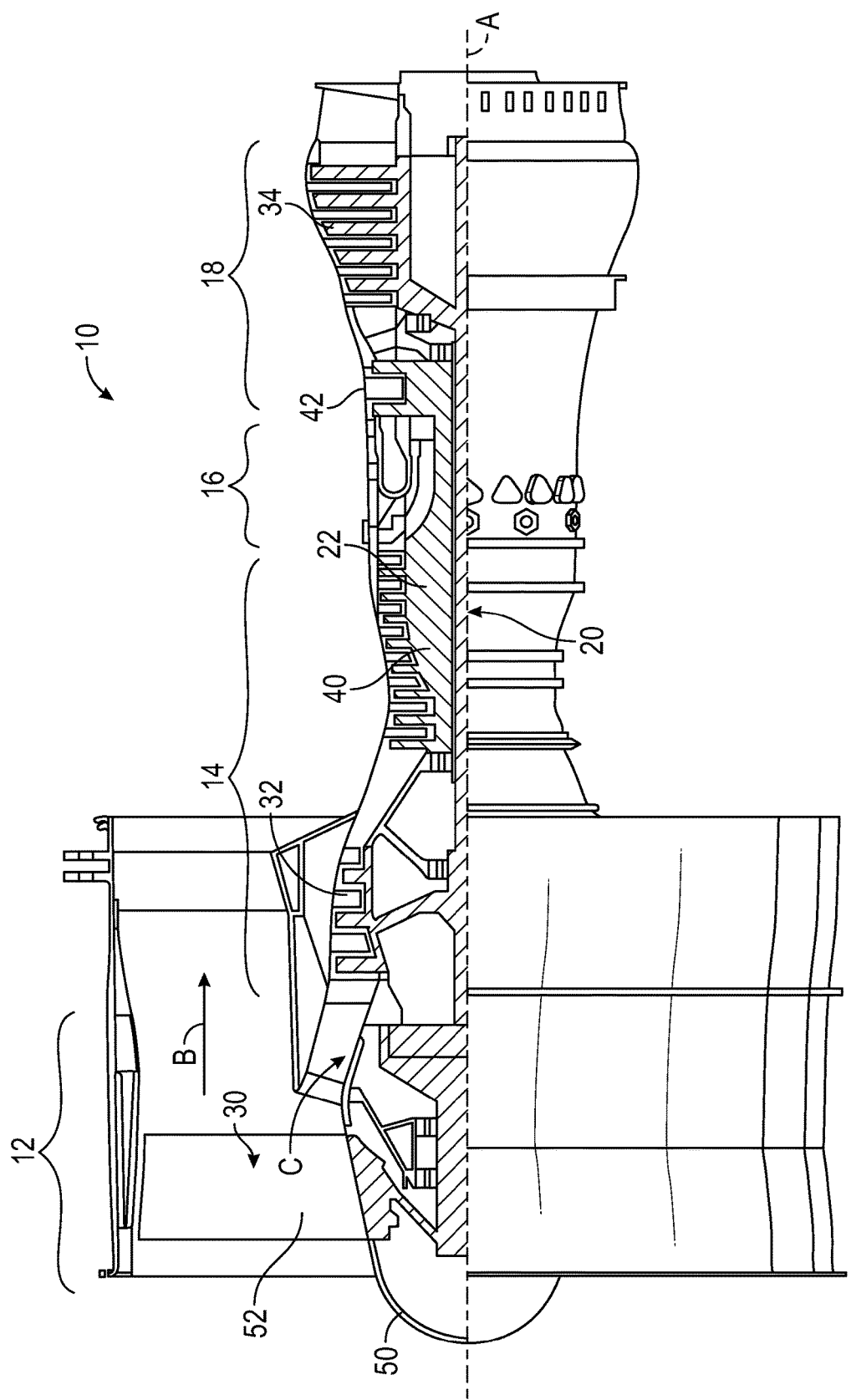
FIG. 1 is a schematic representation of a gas turbine engine having a fan blade.

Referring to FIG. 1 a schematic representation of a gas turbine engine 10 is shown. The gas turbine engine includes a fan section 12, a compressor section 14, a combustor section 16, and a turbine section 18 disposed about a longitudinal axis A. The fan section 12 drives air along a bypass flow path B that may bypass the compressor section 14, the combustor section 16, and the turbine section 18. The compressor section 14 draws air in along a core flow path C where air is compressed by the compressor section 14 and is provided to or communicated to the combustor section 16. The compressed air is heated by the combustor section 16 to generate a high pressure exhaust gas stream that expands through the turbine section 18. The turbine section 18 extracts energy from the high pressure exhaust gas stream to drive the fan section 12 and the compressor section 14.

The gas turbine engine 10 further includes a low-speed spool 20 and a high-speed spool 22 that are configured to rotate the fan section 12, the compressor section 14, and the turbine section 18 about the longitudinal axis A. The low-speed spool 20 may connect a fan 30 of the fan section 12 and a low-pressure compressor portion 32 of the compressor section 14 to a low-pressure turbine portion 34 of the turbine section 18. The high-speed spool 22 may connect a high pressure compressor portion 40 of the compressor section 14 and a high pressure turbine portion 42 of the turbine section 18.

Figure 2:
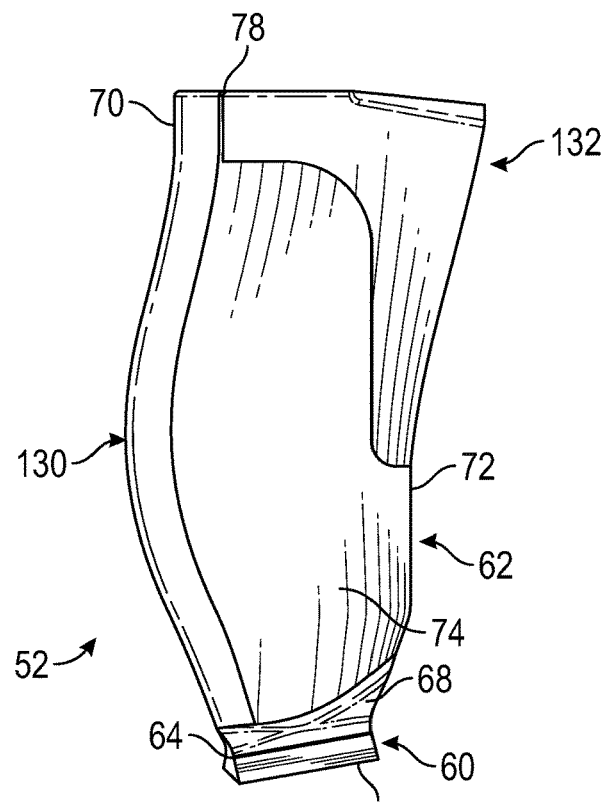
FIG. 2 is a perspective view of the fan blade.
Figure 3:
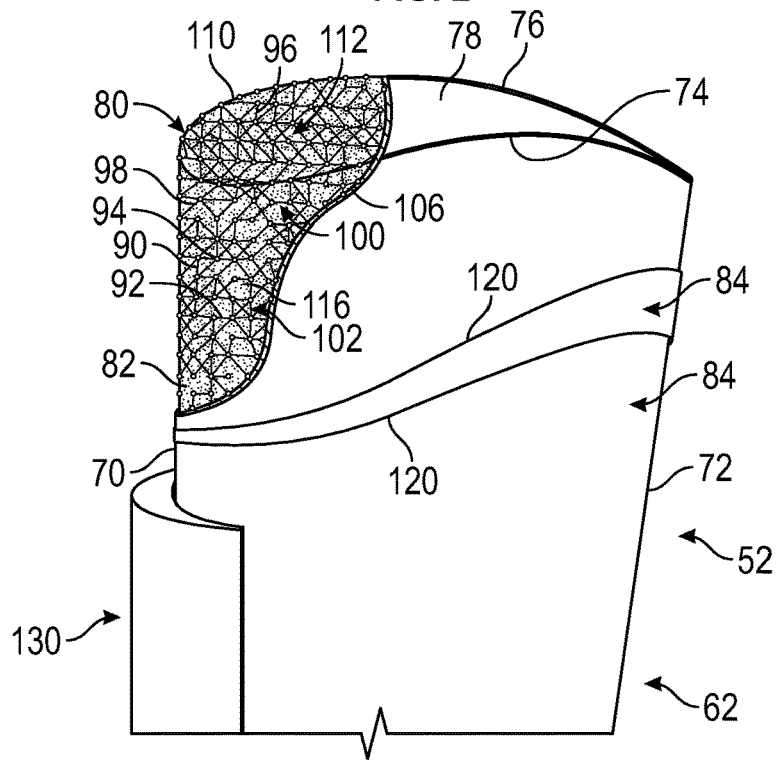
FIG. 3 is a partial cutaway perspective view of the fan blade.

Referring to FIGS. 2 and 3, the fan 30 includes a fan rotor or fan hub 50 that carries a fan blade 52. The fan blade 52 radially extends from the fan hub 50. The fan blade 52 may be a lightweight composite fan blade that includes a root 60 and an airfoil 62 that extends from the root 60.

The root 60 may be configured as a dovetail root, a tree root, or the like that operatively connects the fan blade 52 to the fan hub 50. The root 60 may be made of a metallic material. The root 60 includes a neck 64, a base portion 66, and a transition portion 68. In at least one embodiment, the base portion 66 may be made of a metallic material and the transition portion 68 may be made of a composite material such as a fiber-composite material. The neck 64 is a tapered portion of the root 60 that extends between the base portion 66 and the transition portion 68. The neck 64 has a thickness that is less than a thickness of the base portion 66. The neck 64 has a thickness that is greater than a thickness of the transition portion 68. The transition portion 68 provides a smooth transition from the root 60 to the airfoil 62.

The airfoil 62 radially extends from the root 60. The airfoil 62 includes a leading edge 70, a trailing edge 72, a pressure side 74, a suction side 76, and a tip 78. The leading edge 70 is spaced apart from and disposed opposite the trailing edge 72. The pressure side 74 and the suction side 76 each axially extends between the leading edge 70 and the trailing edge 72. The pressure side 74 and the suction side 76 each radially extend from the root 60 to the tip 78. The pressure side 74 and suction side 76 each connect the leading edge 70 to the trailing edge 72.

The pressure side 74 is configured as a concave surface. The suction side 76 is disposed opposite the pressure side 74 and is configured as a convex surface. The tip 78 is spaced apart from the root 60. The tip 78 extends between distal ends of the leading edge 70 and the trailing edge 72. The tip 78 extends between distal ends of the pressure side 74 and the suction side 76.

The airfoil 62 of the fan blade 52 is formed by a lattice structure 80 provided with a structural fill 82 and the lattice structure 80 is at least partially supported by a structural wrap 84. The lattice structure 80 may be a micro lattice hybrid composite structure formed or manufactured by an additive manufacturing technique such as a direct laser metal sintering process or an electron beam melting process. The micro lattice hybrid composite structure facilitates the creation of a strain focused airfoil 62 of the fan blade 52 that employs various types of lattice structures, lattice density, or lattice thickness. The micro lattice hybrid composite structure may be vibrationally tuned and damped and may increase and impact resistance of the fan blade 52. The lattice structure 80 provided with the structural fill 82 that is at least partially supported by the structural wrap 84 may also be applied to compressor blades, propeller blades, turbine blades, stators, or the like.

The lattice structure 80 may be made of a powdered material such as powdered metal material or a powdered nonmetallic material. The powdered metal material may be nickel-based alloys, titanium-based alloys, aluminum-based alloys, or the like. The powdered nonmetallic material may be ceramics, SLA material, plastics, or the like. A laser beam or electron beam may be directed towards the powdered material to build the lattice structure 80 layer by layer. Each subsequent layer may be fused to a previous layer by the laser beam or electron beam.

The lattice structure 80 is formed by a plurality of radially oriented lattice elements 90 and axially oriented lattice elements 92. The plurality of radially oriented lattice elements 90 and axially oriented lattice elements 92 are coupled to each other at nodes 94. The lattice structure 80 may further include transversely oriented lattice elements 96 and angular lattice elements 98 that extend between nodes 94. The addition of the transversely oriented lattice elements 96 and angular lattice elements 98 provides additional structural support to meet strain energy requirements and other structural requirements of the fan blade 52.

The transversely oriented lattice elements 96 may be coupled to at least one of the radially oriented lattice elements 90 and the axially oriented lattice elements 92. The angular lattice elements 98 may be disposed at an angle with respect to at least one of the radially oriented lattice elements 90, the axially oriented lattice elements 92, and the transversely oriented lattice elements 96. The angular lattice elements 98 may be coupled to at least one of the radially oriented lattice elements 90, the axially oriented lattice elements 92, the transversely oriented lattice elements 96 and at least another angular lattice element through the node 94. In at least one embodiment, the transversely oriented lattice elements 96 may be longitudinally or laterally oriented.

Individual lattice elements may have a varying thickness or varying density to locally adjust structural strength or stiffness of the lattice structure 80. For example, a first portion 100 of the lattice structure 80 may have a first thickness or first density and a second portion 102 of the lattice structure 80 may have a second thickness or second density. The second thickness or the second density may be greater than the first thickness of the first density.

The lattice structure 80 may define at least one spar 106. The at least one spar 106 may be disposed proximate the pressure side 74 or the suction side 76. The at least one spar 106 may extend radially or spanwise from the root 60 towards the tip 78. The at least one spar 106 may be spaced apart from the tip 78. The at least one spar 106 may be disposed between the leading edge 70 and the trailing edge 72. The at least one spar 106 may extend axially or chordwise between the leading edge 70 and the trailing edge 72.

The lattice structure 80 extends radially from a portion of the root 60 towards the tip 78. More specifically, the lattice structure 80 extends radially from the transition portion 68 of the root 60 towards the tip 78. The lattice structure 80 extends axially from the leading edge 70 towards the trailing edge 72. The lattice structure 80 defines a hollow airfoil body 110. The hollow airfoil body 110 includes an interior 112 and an exterior 114 that is disposed opposite the interior 112. The interior 112 of the hollow airfoil body 110 may define a cavity 116.

The structural fill 82 is injected into the cavity 116 defined by the interior 112 of the hollow airfoil body 110. The structural fill 82 is disposed within the cavity 116 defined by the interior 112 of the hollow airfoil body 110. The structural fill 82 fills the interior 112 of the hollow airfoil body 110 to increase or provide a level of rigidity to the lattice structure 80 of the airfoil 62 of the fan blade 52. The structural fill 82 may be a resin-based fill, a foam based fill, a structural foam fill, a chopped fiber-based fill, a resin impregnated with fiber-based fill, a thermoplastic fill, a plastic based fill, or the like.

In at least one embodiment, the combination of portions of the lattice structure 80 and the structural fill 82 defines the at least one spar 106.

The structural wrap 84 is disposed about the exterior 114 of the hollow airfoil body 110. The structural wrap 84 is applied to the exterior of the lattice structure 80 to provide additional structural support to the lattice structure 80. The structural wrap 84 is made of a fiber-composite material that defines a plurality of plies 120. The plurality of plies 120 may have a varying angular orientation relative to the radial or axial direction of the airfoil 62 of the fan blade 52.

The structural wrap 84 extends radially from the root 60 towards the tip 78. The structural wrap 84 extends axially from the leading edge 70 towards the trailing edge 72. The structural wrap 84 extends completely about the hollow airfoil body 110 defined by the lattice structure 80.

A first sheath 130 and a second sheath 132 are provided to protect portions of the fan blade 52. The first sheath 130 may be made of a metallic material such as titanium. The first sheath 130 is disposed proximate the leading edge 70. The first sheath 130 is bonded to the structural wrap 84. The first sheath 130 extends from the root 60 towards the tip 78. The first sheath 130 extends at least partially over the pressure side 74 and the suction side 76.

The second sheath 132 may be made of a metallic material such as titanium. The second sheath 132 is bonded to the structural wrap 84. The second sheath 132 extends between the trailing edge 72 and the tip 78. The second sheath 132 extends at least partially over the pressure side 74, the suction side 76 and the tip 78. The second sheath 132 extends towards and is spaced apart from the first sheath 130. The second sheath 132 may become progressively closer to the first sheath 130 in the axial direction that extends from the root 60 towards the tip 78.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A gas turbine engine, comprising:
a fan blade including a root made of metallic material and an airfoil extending from the root, the airfoil including a leading edge disposed opposite a trailing edge and a tip extending between distal ends of the leading edge and the trailing edge, the airfoil having:
a lattice structure extending radially from a portion of the root towards the tip and extending axially from the leading edge towards the trailing edge, the lattice structure defining an airfoil body having a cavity, and
a structural wrap disposed about the airfoil body, the structural wrap extending radially from the portion of the root towards the tip and extending axially from the leading edge towards the trailing edge the structural wrap being made of a composite material that defines a plurality of plies having varying angular orientation relative to a radial or axial direction of the airfoil.

2. The gas turbine engine of claim 1, wherein the lattice structure is made of powdered metal material.

3. The gas turbine engine of claim 1, wherein the lattice structure is made of a powdered nonmetallic material.

4. The gas turbine engine of claim 1, wherein the lattice structure includes a first portion having a first thickness and a second portion having a second thickness greater than the first thickness.

5. The gas turbine engine of claim 1, wherein the fan blade includes a fill disposed within the cavity.

6. The gas turbine engine of claim 5, wherein the fill is at least one of a resin-based fill, structural foam, and a fiber-based fill.

7. A fan blade for a gas turbine engine, comprising:
a root made of metallic material and an airfoil extending from the root, the airfoil including a leading edge disposed opposite a trailing edge and a tip extending between distal ends of the leading edge and the trailing edge, the airfoil having:
a lattice structure defining an airfoil body having a cavity, the lattice structure defining at least one spar that extends radially from the root of the airfoil body towards the tip of the airfoil;
a fill disposed within the cavity; and
a structural wrap disposed about the lattice structure, the structural wrap defining a plurality of plies extending from a leading edge of the airfoil body towards a trailing edge of the airfoil body the structural wrap being made of a composite material that defines a plurality of plies having varying angular orientation relative to a radial or axial direction of the airfoil.

8. The fan blade of claim 7, wherein the lattice structure is made of a powdered metal material.

9. The fan blade of claim 7, wherein the lattice structure is made of a powdered nonmetallic material.

10. The fan blade of claim 7, wherein the fill is at least one of a resin based fill, a foam fill, and a thermoplastic fill.

11. The fan blade of claim 7, wherein the structural wrap is made of a composite material.

12. The fan blade of claim 7, further comprising a first sheath disposed proximate the leading edge of the airfoil body and bonded to the structural wrap.

13. The fan blade of claim 12, further comprising a second sheath bonded to the structural wrap and extending between the trailing edge and the tip of the airfoil body.

14. A method of manufacturing a fan blade, comprising:
forming a lattice structure by direct laser metal sintering of a powdered metal, so that the lattice structure defines an airfoil body; and
filling an interior of the lattice structure with a fill, the combination of the lattice structure and the fill defining at least one spar that extends from a root of the airfoil body towards a tip of the airfoil body; and
wrapping a structural wrap about an exterior of the lattice structure, the structural wrap defines a plurality of plies having a varying angular orientation relative to a radial or axial direction of the fan blade.

15. The method of claim 14, further comprising:
applying a first sheath to the structural wrap proximate a leading edge of the airfoil body.

\* \* \* \* \*